US006386311B2

(12) United States Patent
Weisgerber (10) Patent No.: US 6,386,311 B2
(45) Date of Patent: May 14, 2002

(54) LIMITED INDEPENDENT STEERING DEVICE

(75) Inventor: Thomas W. Weisgerber, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/773,028

(22) Filed: Jan. 31, 2001

Related U.S. Application Data

(60) Provisional application No. 60/183,586, filed on Feb. 18, 2000.

(51) Int. Cl.[7] .............................. B62D 5/04; F16F 9/00
(52) U.S. Cl. ...................... 180/402; 180/411; 180/412; 180/443; 701/41; 188/266; 188/312
(58) Field of Search ................................ 180/446, 402, 180/403, 444, 422, 441, 447, 443, 445, 406, 419, 421, 404, 405, 407, 417, 411, 412; 701/41, 42, 43, 48; 267/118; 188/312, 266

(56) References Cited

U.S. PATENT DOCUMENTS

| | | | | |
|---|---|---|---|---|
| 4,741,409 A | * | 5/1988 | Westercamp et al. ....... | 180/402 |
| 5,289,891 A | * | 3/1994 | Sugiyama ................... | 180/412 |
| 5,791,432 A | * | 8/1998 | Fushimi et al. ............. | 180/412 |
| 6,208,923 B1 | * | 3/2001 | Hommel ...................... | 701/41 |
| 6,318,494 B1 | * | 11/2001 | Pattok ........................ | 180/402 |
| 2001/0032762 A1 | * | 10/2001 | Weisgerber ................. | 188/266 |

* cited by examiner

Primary Examiner—Douglas C. Butler
(74) Attorney, Agent, or Firm—Edmund P. Anderson (57) ABSTRACT

A device and method for transferring steering responsibility from a first electro-mechanical actuator to a second electro-mechanical actuator comprises a cylinder and a first piston slideably disposed within the cylinder. A second piston is slideably disposed within an interior chamber of the first piston. A first locking sleeve is disposed within the interior chamber, a second locking sleeve is disposed within the interior chamber in opposition to the first locking sleeve, a first spring is disposed within the interior chamber interposed between the first locking sleeve and the first piston, and a second spring is disposed within the interior chamber interposed between the second locking sleeve and the first piston. The pistons and the locking sleeves also each include at least one groove disposed therein. Snap rings may be disposed within the grooves. A damping mechanism may also be incorporated into the structure of the device.

20 Claims, 8 Drawing Sheets

LIMITED INDEPENDENT STEERING DEVICE

CROSS REFERENCE TO RELATED APPLICATION

This application claims the benefit of an earlier filing date from U.S. Provisional Application No. 60/183,586, filed Feb. 18, 2000, the content of which is incorporated herein by reference in its entirety.

TECHNICAL FIELD

This disclosure relates to a limited independent steering device in a steer-by-wire steering system.

BACKGROUND

Vehicular steer-by-wire systems encourage independency in the steering of a pair of steered wheels. In such a steering system, the position of each wheel is controlled by a computer controlled electro-mechanical actuator dedicated to that wheel. The purpose of the independency of the steered wheels is to allow greater capability in the dynamic control of the vehicle. This is accomplished by making steering commands directed to the pair of steered wheels independent of one another. However, it is desirable that a steer-by-wire system possess redundant steering capabilities in the event of the failure of an electro-mechanical actuator. This may be accomplished by a device interconnecting two actuators, which is activated in response to such a failure, and thus shifts or transfers the "load" or steering responsibility of the inoperative actuator to the remaining, operative actuator. This allows the operative actuator to take command of both of the steered wheels.

It is also desirable that such a device be capable of maintaining the aforesaid independency while the vehicle is being operated in its normal mode, i.e., when both actuators are fully operational. This may be accomplished by including a free motion displacement capability within the device. However, the aforesaid independency is lost when command is shifted or transferred from an inoperative to an operative electro-mechanical actuator.

SUMMARY

Described herein is a device for transferring steering responsibility from a first electro-mechanical actuator to a second electro-mechanical actuator comprising a cylinder and a first piston slideably disposed within the cylinder. The first piston includes an interior chamber. A second piston is slideably disposed within the interior chamber of the first piston. The device further comprises a first locking sleeve disposed within the interior chamber, a second locking sleeve disposed within the interior chamber in opposition to the first locking sleeve, a first spring disposed within the interior chamber interposed between the first locking sleeve and the first piston and a second spring disposed within the interior chamber interposed between the second locking sleeve and the first piston. The first piston further includes at least one recessed groove juxtaposed to the interior chamber. The first and second locking sleeves each also include at least one recessed groove capable of being brought into alignment with and opposition to the aforesaid at least one recessed groove of the first piston. The second piston also includes at least one recessed groove also capable of being brought into alignment with and opposition to the aforesaid at least one recessed groove of the first piston. The aforesaid recessed grooves of the first and second locking sleeves and second piston each include a snap ring intimately engaged therewith such that upon actuation of the device, the snap rings deploy and are captured by the recessed grooves of the interior chamber, thus locking one of the first or second locking sleeves and the second piston into place within the interior chamber. Such locking of the first or second locking sleeves and the second piston is thereby effective in transferring steering responsibility from a first electro-mechanical actuator to a second electro-mechanical actuator. The device may also include a fluid that acts as damping mechanism.

A method of transferring steering responsibility from a first electro-mechanical actuator to a second electro-mechanical actuator includes slideably disposing a first piston in an interior chamber of a cylinder, slideably disposing a second piston within the interior chamber of the first piston and allowing the first piston to move freely within the cylinder, allowing the second piston to move freely within the first piston, and allowing the first and second piston to be locked together, thereby transferring steering responsibility from a first electro-mechanical actuator to a second electro-mechanical actuator.

DETAILED DESCRIPTION

Figure 1:
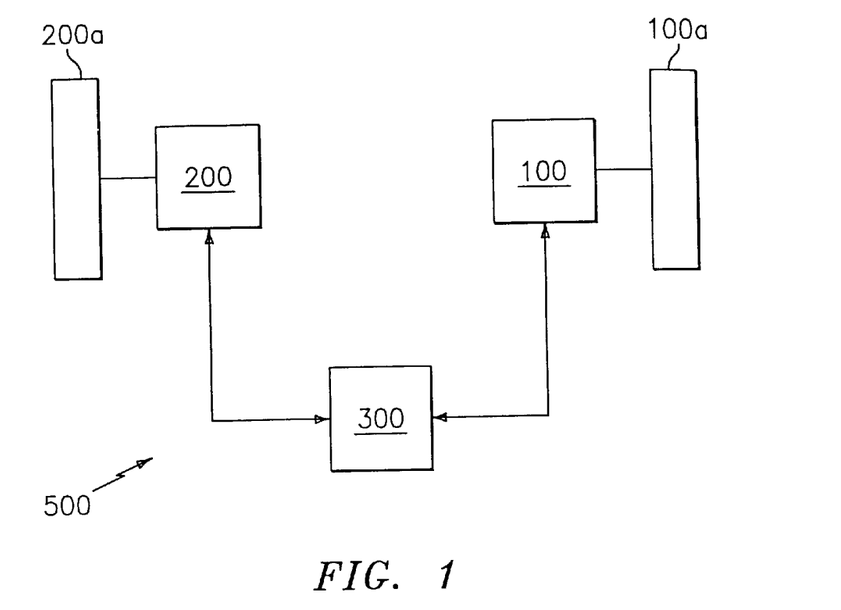
FIG. 1 is a generalized schematic drawing of a typical steer-by-wire steering system.

Referring to FIGS. 1 through 7, a limited independent steering device is described. FIG. 1 is, by way of exemplification and not limitation, a generalized schematic drawing of a typical steer-by-wire steering system 500. The typical steer-by-wire steering system 500 generally comprises a first electro-mechanical actuator 100 in operable communication with a first wheel 100*a* and a second electro-mechanical actuator 200 in operable communication with a second wheel 200*a*. As can be best understood from FIG. 1, first electro-mechanical actuator 100 and second electro-mechanical actuator 200 are independently controlled by a controller 300.

Figure 2:
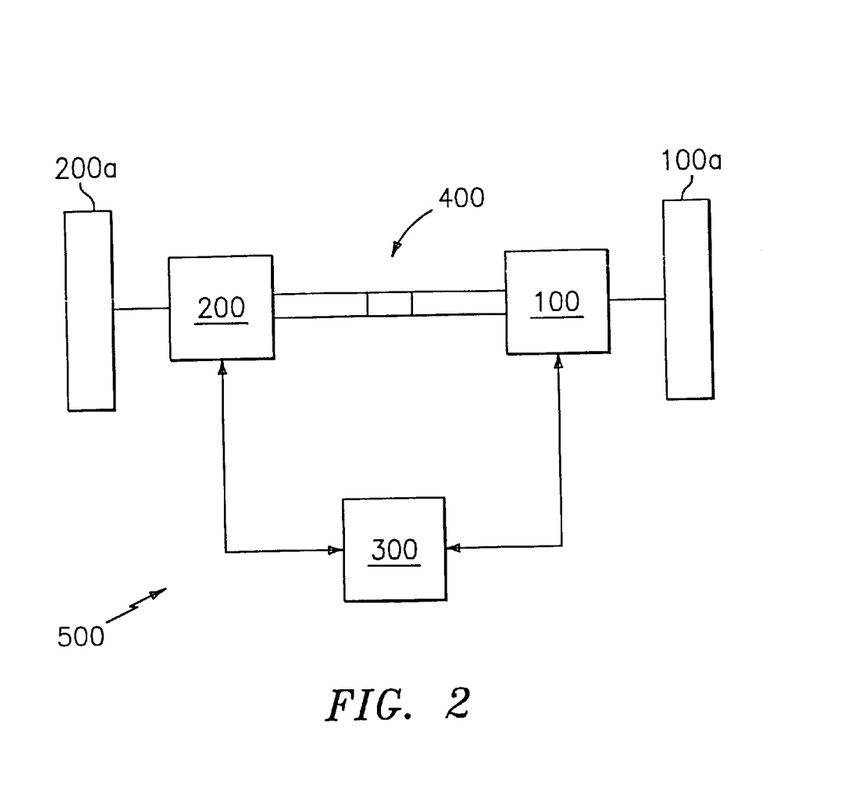
FIG. 2 is a generalized schematic drawing of a limited independent steering device disposed within the typical steer-by-wire system of FIG. 1.

Referring now to FIG. 2, there is depicted, by way of exemplification and not limitation, a generalized schematic drawing of a limited independent steering device 400 disposed within the typical steer-by-wire system 500 of FIG. 1. As can be seen in FIG. 2, limited independent steering device 400 is operably connected to first electro-mechanical actuator 100 and to second electro-mechanical actuator 200.

Figure 3:
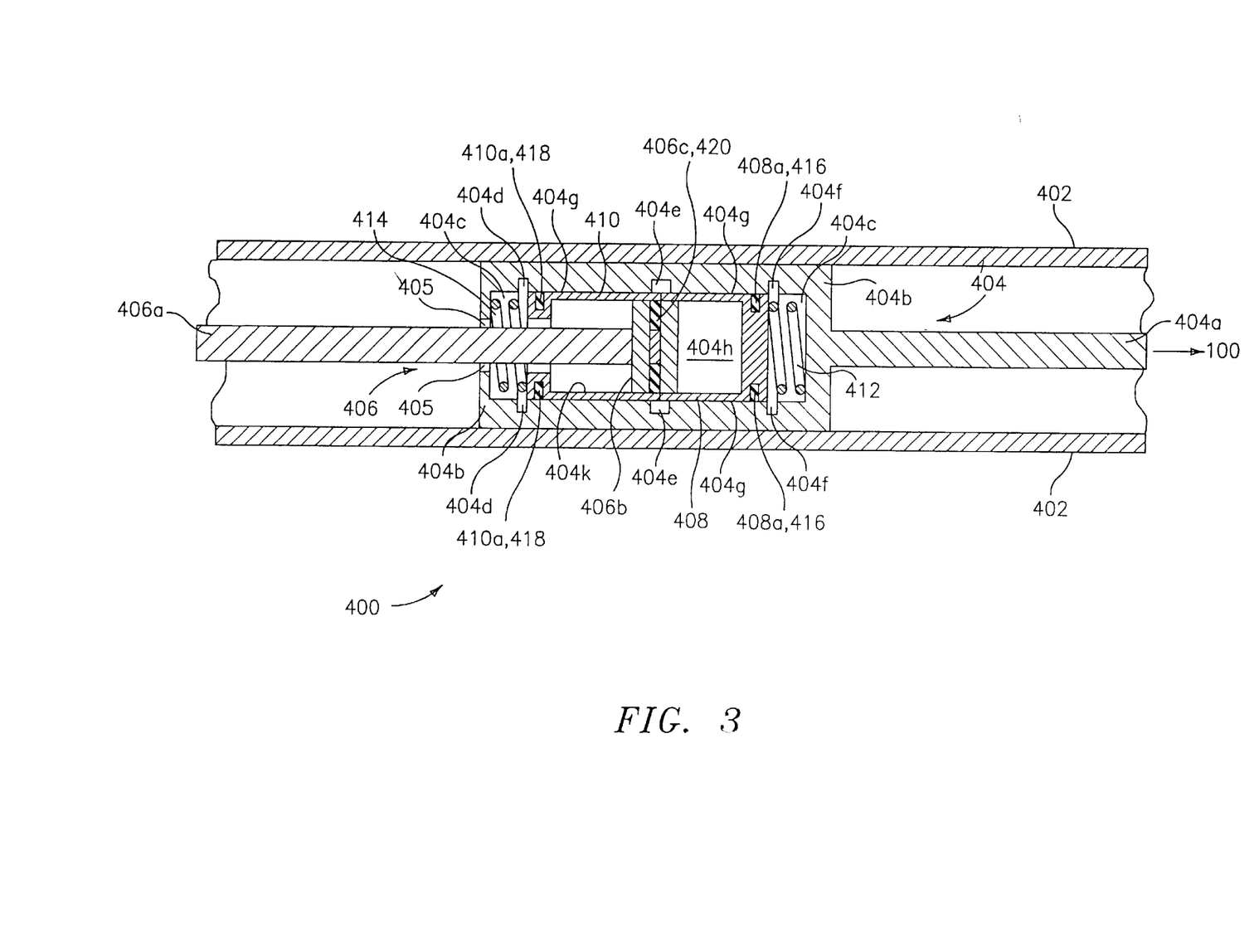
FIG. 3 is a cross sectional depiction of the limited independent steering device in its normal mode of operation as it generally comprises a cylinder, a first piston, and a second piston.

Referring now to FIG. 3, therein depicted, by way of exemplification and not limitation, is a cross sectional representation of limited independent steering device 400 in its normal mode of operation. Limited independent steering device 400 comprises a cylinder 402, a first piston 404 and a second piston 406. As can be seen from FIG. 3, first piston 404 includes a first rod 404a and a first head 404b. First rod 404a is typically connected to first electro-mechanical actuator 100 as the rack of a rack and pinion steering apparatus. First piston 404 is slideably disposed within cylinder 402 and allowed to move freely therein (subject to steering commands imparted to first piston 404 by way of first rod 404a and first electro-mechanical actuator 100). First head 404b is configured to accommodate the disposition of second piston 406 and includes an interior chamber 404c defined by a first interior surface 404g. First head 404b includes a plurality of recessed grooves 404d, 404e, 404f disposed in first interior surface 404g and juxtaposed to interior chamber 404c.

Limited independent steering device 400 further comprises a first locking sleeve 408 slideably disposed within interior chamber 404c and a second locking sleeve 410 slideably disposed within interior chamber 404c in opposition to first locking sleeve 408. The disposition of first and second locking sleeves 408, 410 is such that an interior volume 404h is defined by a second interior surface 404k to accommodate the disposition of second piston 406 therewithin. First locking sleeve 408 and second locking sleeve 410 each include a recessed groove 408a, 410a disposed therein that is juxtaposed to interior surface 404g. Still further, limited independent steering device 400 includes a first spring 412 and a second spring 414. First spring 412 is disposed within interior chamber 404c and interposed between first head 404b and first locking sleeve 408. Second spring 414 is disposed within interior chamber 404c and is interposed between first head 404b and second locking sleeve 410. As can be best understood from FIG. 3, first spring 412 and second spring 414 act in opposition to cause first locking sleeve 408 and second locking sleeve 410 to contact one another while limited independent steering device 400 is in a normal operating mode.

Still referring to FIG. 3, second piston 406 includes a second rod 406a and a second head 406b. Second rod 406a is typically connected to second electro-mechanical actuator 200 as the rack of a rack and pinion steering apparatus. As can be best understood from FIG. 3, second head 406a is slideably disposed within interior volume 404h and allowed to move freely therein. A rod seal 405 is disposed within first head 404b and around second rod 406a to prevent leakage of fluid from the actuator side of first head 404b into the piston area. Second head 406b includes a recessed groove 406c disposed therein and juxtaposed to second interior surface 404k. It can also be seen in FIG. 3 that limited independent steering device 400 includes a plurality of snap rings 416, 418, 420. Snap rings 416, 418, 420 are intimately engaged with recessed groove 408a of first locking sleeve 408, recessed groove 410a of second locking sleeve 410, and recessed groove 406c of second head 406b. Snap rings 416, 418, 420 are configured to be capable of full or partial release from the intimate engagement with the recessed grooves 408a, 410a, 406c.

It should be understood from FIG. 3 that, while limited independent steering device 400 is operating in a normal mode, first piston 404 is allowed to move freely within cylinder 402 (subject to commands from the first electro-mechanical actuator 100) and second piston 406 is allowed to move freely within interior volume 404h (subject to commands from second electro-mechanical actuator 200).

Figure 4:
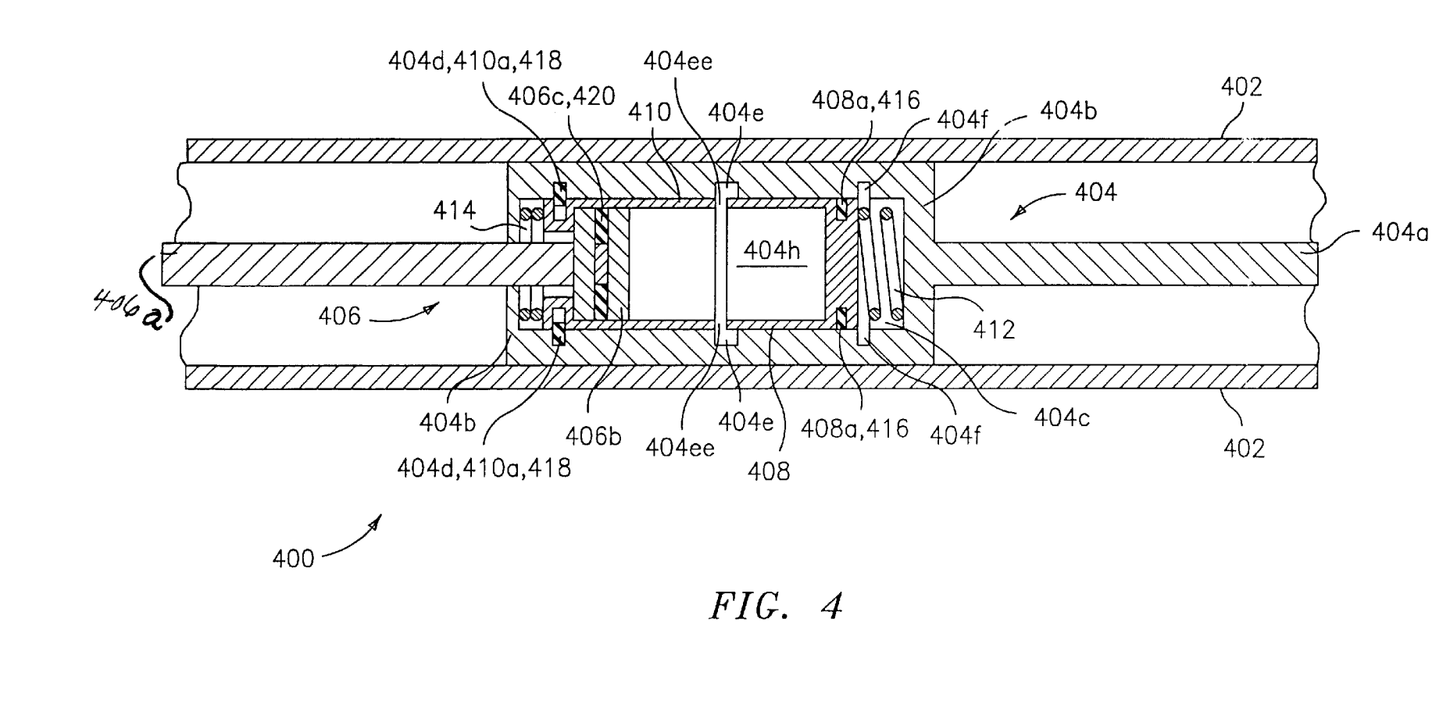
FIG. 4 is a cross sectional depiction of the limited independent steering device activated in a first semi-locked position.

A first transfer of steering responsibility from one of the electro-mechanical actuators to the other of the electro-mechanical actuators is explained with reference to FIGS. 4 and 5. FIG. 4 depicts, by way of exemplification and not limitation, a cross sectional representation of limited independent steering device 400 deployed in a first "semi-locked" position of a plurality of "semi-locked" positions. The first "semi-locked" position is accomplished when the relative motion between first piston 404 and second piston 406 is such that second head 406b, (subject to steering commands from second electro-mechanical actuator 200) moves within interior volume 404h until contact is made with second locking sleeve 410. Continued movement by second head 406b causes second locking sleeve 410 to move against the action of second spring 414 until second spring 414 is fully compressed. Thereupon, a first recessed groove of the plurality of recessed grooves 404d, and recessed groove 410a are aligned with respect to one another. Such alignment causes second snap ring 418 to deploy to engage recessed grooves 404d, 410a. Such engagement locks second locking sleeve 410 in position within interior chamber 404c while still allowing second head 406a the freedom to travel within the interior volume 404h. As can be seen in FIG. 4, the engagement of second locking sleeve 410 in the "semi-locked" position causes a partial opening 404ee to be created between recessed groove 404e and interior volume 404h.

Figure 5:
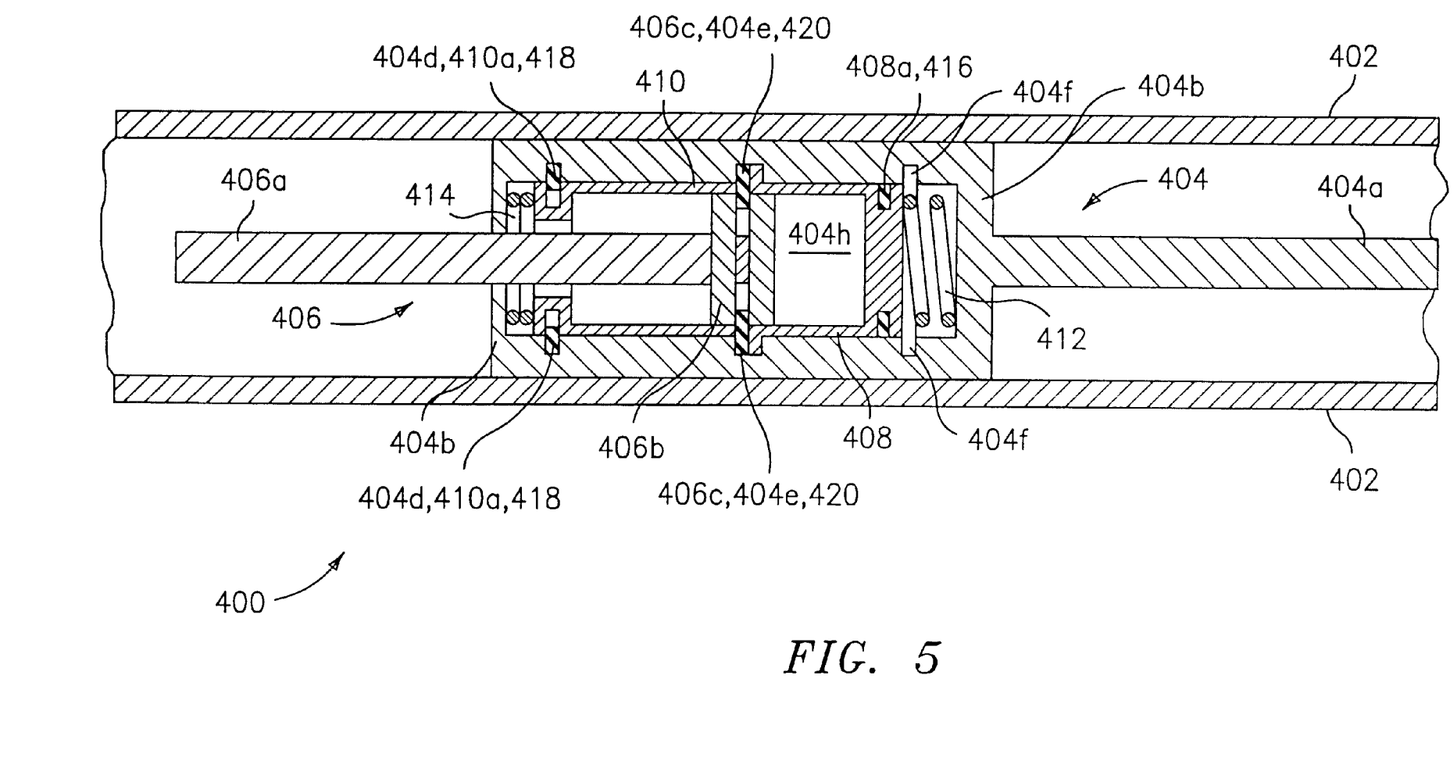
FIG. 5 is a cross sectional depiction of the limited independent steering device activated in a first fully locked position.

Reference is now made to FIG. 5. Therein depicted, by way of exemplification and not limitation, is a cross sectional representation of limited independent steering device 400 in a first "fully locked" position of a plurality of "fully locked" positions. As can be best understood from FIG. 5, and as noted above in conjunction with FIG. 4, second locking sleeve 410 is locked in position with respect to interior chamber 404c while second head 406b has moved toward first electro-mechanical actuator 100 such that recessed groove 406c and recessed groove 404e are now aligned. This alignment causes third snap ring 420 to deploy through the aforementioned partial opening 404ee and engage both recessed groove 406c and recessed groove 404e, thus arresting the movement of second head 406b in the "fully locked" position and transferring the steering responsibility from one of the electro-mechanical actuators to the other of the electro-mechanical actuators. It should be understood from FIG. 5 that, despite the arrangement of limited independent steering device 400 shown in the first "fully-locked" position, there is a small amount of movement in the direction of first electro-mechanical actuator 100, not shown in the interest of clarity, still available to second head 406b.

Figure 6:
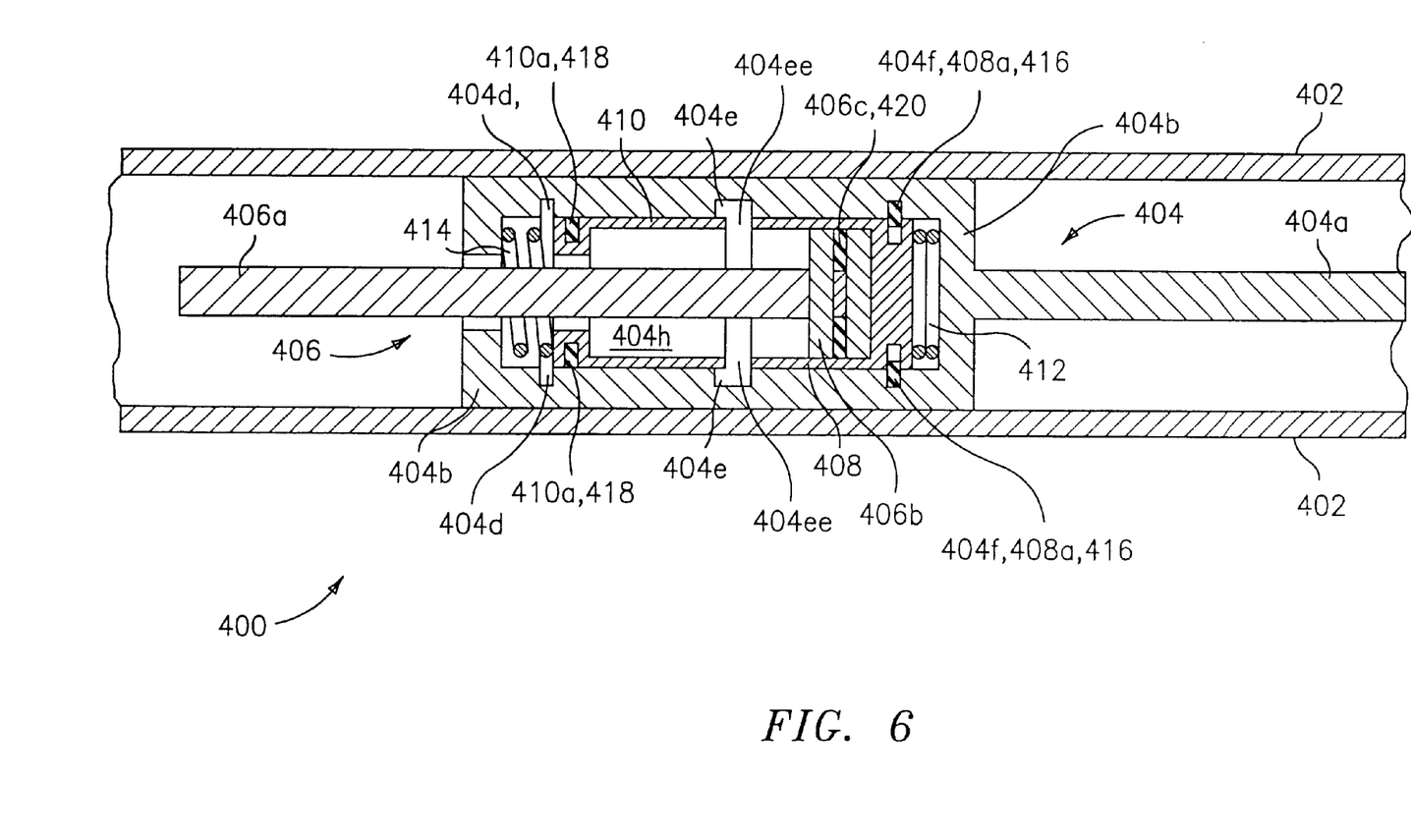
FIG. 6 is a cross sectional depiction of the limited independent steering device activated in a second semi-locked position.

A second transfer of steering responsibility from one of the electro-mechanical actuators to the other of the electro-mechanical actuators may also be accomplished and is explained with reference to FIG. 6 and FIG. 7. FIG. 6 depicts, by way of exemplification and not limitation, a cross sectional representation of limited independent steering device 400 deployed in a second "semi-locked" position of the plurality of "semi-locked" positions. The second "semi-locked" position is accomplished when the relative motion between first and second pistons 404, 406 is such that second head 406b, moves fully in the direction of first electro-mechanical actuator within interior volume 404h, thereby contacting first locking sleeve 408. Continued movement in that direction causes first locking sleeve 408 to move against the action of first spring 412 until first spring 412 is fully compressed. Thereupon, recessed grooves 404f, 408a are aligned with respect to one another. Such alignment causes snap ring 416 to deploy to engage both recessed groove 404f and recessed groove 408a. Such engagement locks first locking sleeve 408 in position in interior chamber 404c while still allowing second head 406a the freedom to move within interior volume 404h. As seen in FIG. 6, the engagement of first locking sleeve 408 in the "semi-locked" position again causes partial opening 404ee to be created between recessed groove 404e and interior volume 404h.

Figure 7:
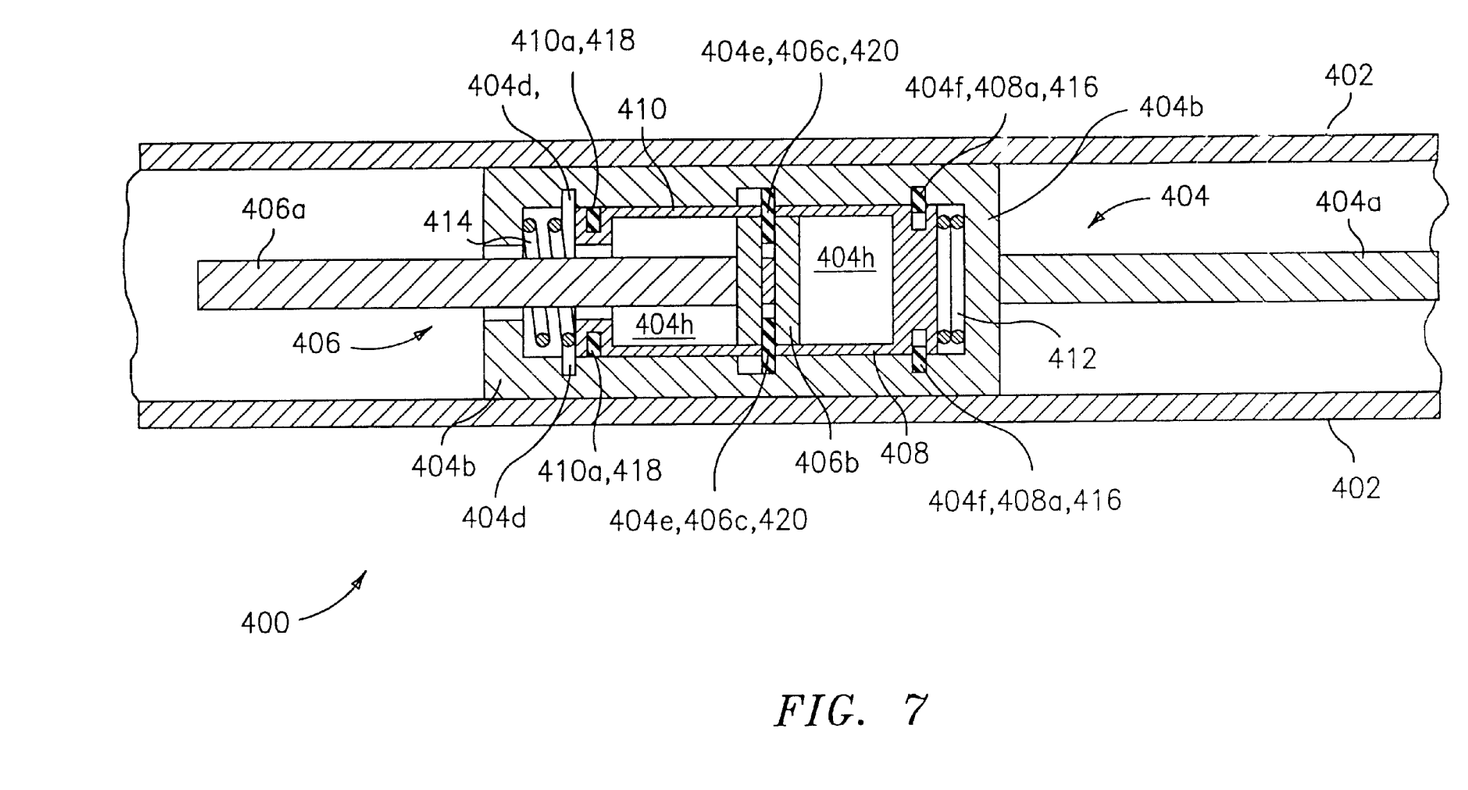
FIG. 7 is a cross sectional depiction of the limited independent steering device activated in a second fully locked position.

Reference is now made to FIG. 7. Therein depicted, by way of exemplification and not limitation, is a cross sectional representation of limited independent steering device 400 in a second "fully locked" position of the plurality of "fully locked" positions. As can be best understood from FIG. 7, and as noted in conjunction with FIG. 6, first locking sleeve 408 is locked in position with respect to interior chamber 404c while second head 406b has moved in interior volume 404h such that recessed groove 406c and recessed groove 404e are now aligned with one another. This alignment causes snap ring 420 to deploy through partial opening 404ee and engage both recessed groove 406c and recessed groove 404e, thus arresting the movement of second head 406b in the second "fully locked" position and thereby transferring the steering responsibility from one of the electro-mechanical actuators to the other of the electro-mechanical actuators. It should be understood from FIG. 7 that, despite the arrangement of the limited independent steering device 400 shown in the second "fully locked" position, there is a small amount of movement in the direction of second electro-mechanical actuator 200, not shown in the interest of clarity, still available to second head 406b.

Figure 8:
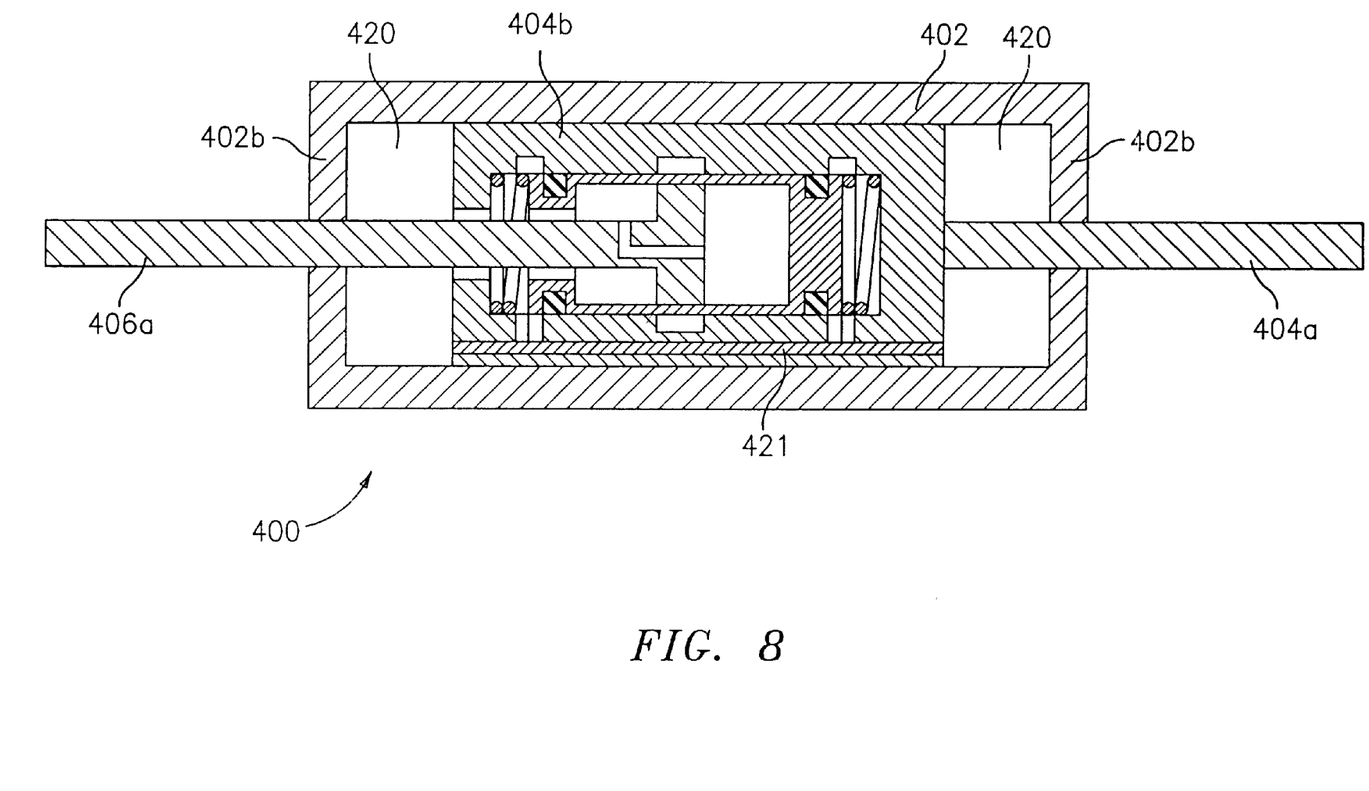
FIG. 8 is a cross sectional depiction of a limited independent steering device having a damping mechanism.

Rapid movements of a motor vehicle comprising limited independent steering device 400 oftentimes result in the impact of the various components of limited independent steering device 400. Such impact subjects electro-mechanical actuators 100, 200 to backloading conditions, which may be experienced by the operator of the motor vehicle. Referring to FIG. 8, limited independent steering device 400 is shown as having damping mechanisms incorporated therein. Such damping mechanisms either aid in reducing the backloading conditions imposed on electro-mechanical actuators 100, 200 or prevent such backloading conditions altogether.

As seen in FIG. 8, cylinder 402 is sealed around outer piston rod 404a and inner piston rod 406a with sidewalls 402b, thereby defining a pair of oil reservoirs 420 on either side that are filled with a viscous fluid such as shock absorber oil or some other damping fluid. As a result, outer piston head 404b functions as the piston head of a shock absorber, thereby providing a damping function. An oil conduit 421 provides fluid communication between oil reservoirs 420 at either end of cylinder 402. The dimensions of oil conduit 421 may be such that a predetermined damping rate is created. The fluid communication is maintained by configuring oil conduit 421 to extend either directly through cylinder 402 or through outer piston head 404b. Control over the damping action may also be effectuated by valving oil conduit 421; a restriction within oil conduit 421 offers stiffer damping action, while allowing for substantially unrestricted fluid communication between oil reservoirs 420 provides minimal or substantially no damping effects.

Figure 9:
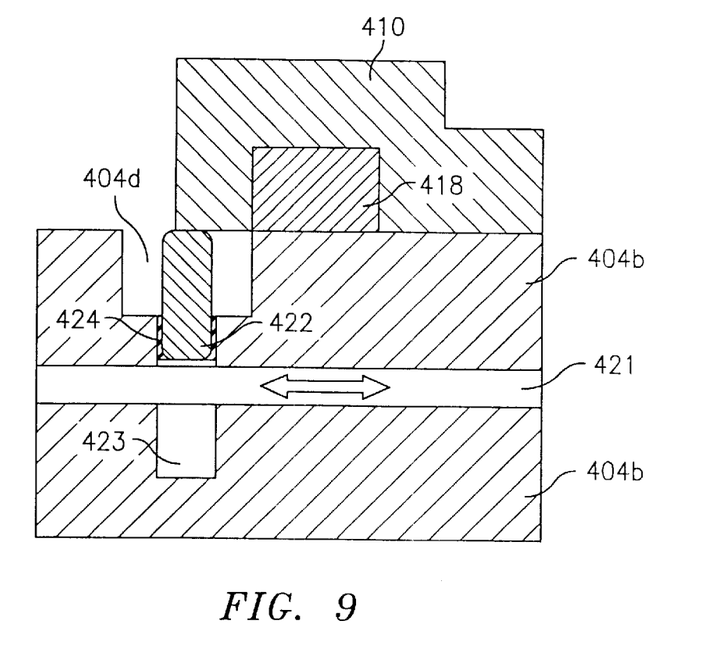
FIG. 9 is a cross sectional depiction of the damping mechanism in a free flow mode.
Figure 10:
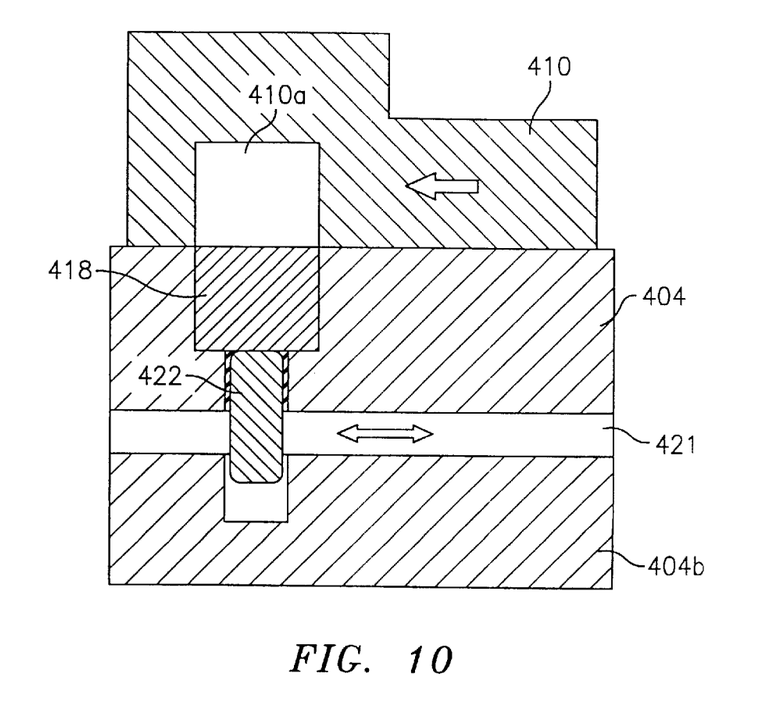
FIG. 10 is a cross sectional depiction of the damping mechanism in a restricted flow mode.

Referring to FIGS. 9 and 10, particular details of the damping mechanism are illustrated. Damping control is effectuated through the use of a blocking pin 422 slideably mounted in a bore 423 within outer piston head 404b. A hydraulic seal 424 placed between blocking pin 422 and the defining wall of bore 423 prevents the leakage of hydraulic fluid to recessed groove 404d. During normal operation, the pressure of the oil biases blocking pin 422 out of oil conduit 421 and into a free flow position, thereby resulting in minimal or substantially no damping of outer piston 404.

As shown in FIG. 10, in the event of an actuator failure, second locking sleeve 410 locks in a manner as previously described with respect to FIG. 4, and snap ring 418 biases locking pin 422 to a flow restrictive position. The restricted flow stiffens the damping effect of outer piston 404. The degree to which the pin restricts the flow may be controlled by such factors as oil viscosity, pin diameter, the provision of small holes across the width of the pin, and other such means. A similar locking pin mechanism may be provided for first locking sleeve 408.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steering device for transferring steering responsibility from a first electro-mechanical actuator to a second electro-mechanical actuator, the steering device comprising:
   a cylinder;
   a first piston slideably disposed within the cylinder;
   an interior chamber disposed within the first piston; and
   a second piston slideably disposed within the interior chamber of the first piston.

2. The steering device as set forth in claim 1 further comprising:
   a first locking sleeve slideably disposed within the interior chamber;
   a second locking sleeve slideably disposed within the interior chamber and positioned opposite the first locking sleeve, the second locking device being configured to accommodate the disposition of the second piston within the interior chamber;
   a first spring disposed within the interior chamber and interposed between the first locking sleeve and the first piston;
   a second spring disposed within the interior chamber and interposed between the second locking sleeve and the first piston.

3. The steering device as set forth in claim 2 wherein the first piston includes a plurality recessed grooves juxtaposed to the interior chamber.

4. The steering device as set forth in claim 3 wherein the second piston includes at least one recessed groove juxtaposed to the interior chamber.

5. The steering device as set forth in claim 4 wherein the first locking sleeve includes at least one recessed groove juxtaposed between the first locking sleeve and the first piston.

6. The steering device as set forth in claim 5 wherein the second locking sleeve includes at least one recessed groove juxtaposed between the second locking sleeve and the second piston.

7. The steering device as set forth in claim 6 further comprising at least one snap ring.

8. The steering device as set forth in claim 2 further comprising a damping mechanism incorporated therein.

9. The steering device as set forth in claim 8 wherein said damping mechanism comprises a conduit extending between opposing ends of said cylinder, said conduit being configured to maintain communication between opposing ends of said cylinder.

10. The steering device as set forth in claim 9 wherein a fluid is disposed in said opposing ends of said cylinder, said fluid providing fluid communication between said opposing ends of said cylinder.

11. A method of transferring steering responsibility from a first electro-mechanical actuator to a second electro-mechanical actuator, the method comprising:

disposing a slideable first piston within a cylinder; and disposing a slideable second piston within an interior chamber of the first piston.

12. The method as set forth in claim 11 further comprising:

disposing a slideable first locking sleeve within the interior chamber of the first piston;

disposing a slideable second locking sleeve within the interior chamber of the first piston in opposition to the first locking sleeve;

disposing a first spring within the interior chamber of the first piston, the first spring being interposed between the first locking sleeve and the first piston; and disposing a second spring within the interior chamber of the first piston, the second spring being interposed between the second locking sleeve and the first piston.

13. The method as set forth in claim 12 further comprising disposing within the first piston a plurality of recessed grooves juxtaposed to the interior chamber.

14. The method as set forth in claim 13 further comprising disposing within the second piston at least one recessed groove juxtaposed to the interior chamber.

15. The method as set forth in claim 14 further comprising disposing at least one recessed groove within the first locking sleeve, the at least one groove being juxtaposed between the first locking sleeve and the first piston.

16. The method as set forth in claim 15 further comprising disposing at least one recessed groove within the second locking sleeve, the at least one groove being juxtaposed between the second locking sleeve and the second piston.

17. The method as set forth in claim 16 further comprising disposing at least one snap ring within the recessed grooves such that at least one snap ring is intimately engaged with the recessed grooves.

18. The method of claim 17 further comprising allowing the first piston to move freely within the cylinder.

19. The method of claim 18 further comprising allowing the second piston to move freely within the interior chamber of the first piston.

20. The method of claim 19 further comprising allowing the at least one snap to at least partially release from the intimate engagement with the recessed grooves.

* * * * *